(No Model.)
H. F. COATES.
BALL BEARING WHEEL.
No. 531,101. Patented Dec. 18, 1894.
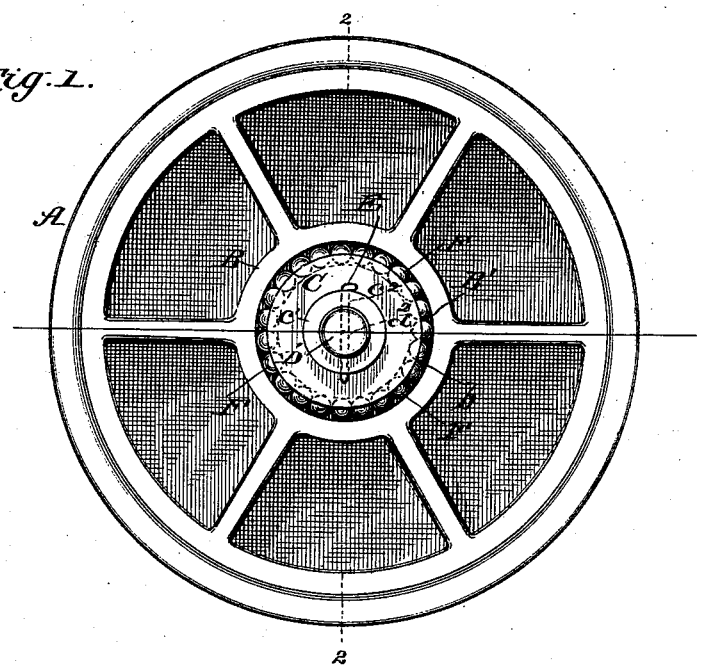
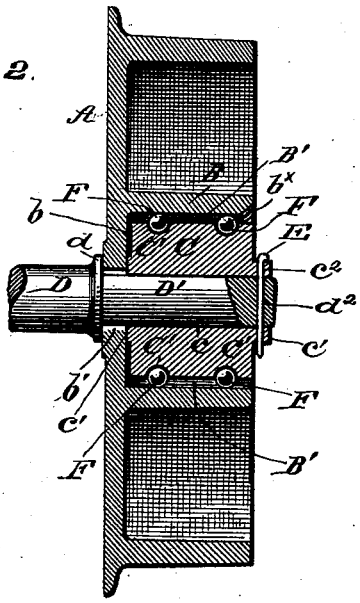
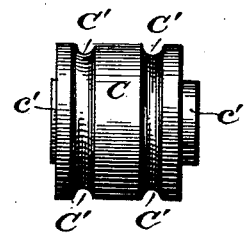
WITNESSES:
Fred G. Dieterich
Jos. A. Ryan
INVENTOR
Hallam F. Coates
BY Munn & Co
ATTORNEYS.

UNITED STATES PATENT OFFICE.

HALLAM F. COATES, OF CAMBRIDGE, OHIO.

BALL-BEARING WHEEL.

SPECIFICATION forming part of Letters Patent No. 531,101, dated December 18, 1894.

Application filed December 11, 1893. Serial No. 493,330. (No model.)

*To all whom it may concern:*

Be it known that I, HALLAM F. COATES, residing at Cambridge, in the county of Guernsey and State of Ohio, have invented certain new and useful Improvements in Ball-Bearing Wheels, of which the following is a specification.

My invention relates to improvements in ball bearing wheels and it has primarily for its object to provide a wheel of this kind, simple in construction, of few parts, easy of manufacture and put together, in which the use of bolts, gaskets, caps, nuts and other loose parts now generally used on wheels of this kind, is dispensed with.

It has also for its object to provide a construction which will save oil, which will reduce the friction to the minimum, in which the axle will be protected and in which the parts are so arranged, as to give the inside of the wheel the same wearing qualities as the outside.

With other objects in view which hereinafter will be referred to, the invention consists in the peculiar combination and novel arrangement of parts, which will be first described in detail and then specifically pointed out in the claims, reference being had to the accompanying drawings, in which—

Figure 1 is an inner face view of a car wheel constructed in accordance with my invention. Fig. 2 is a vertical section of the same taken on the line 2—2 Fig. 1, and Fig. 3 is a side view of the filler or bearing hub.

Referring to the accompanying drawings A indicates a car wheel formed with a central hub or socket portion B, having a chamber B', the inner portion of which terminates in a straight bearing wall $b$ formed by the inner wall or face of the wheel, while its outer end extends flush with the outer face of the wheel, such wall $b$ having a central aperture $b'$ through which the axle spindle is adapted to pass but not contact with for a purpose presently explained.

By reference to Fig. 2 of the drawings it will be observed the bearing face of the chamber B' extends horizontally from the wall $b'$ outward, such construction providing an unobstructed socket in which the filler or axle bearing C can be readily inserted or removed, and also providing a bearing chamber in which the inside walls can be easily chilled to make the wearing life of the inside equal to the outside, and giving, as it were, a more lasting and smooth bearing surface.

The filler or axle bearing C is centrally apertured as at $c$ to receive the spindle D', of the axle D. This filler is of a slightly less diameter than the chamber B', and at the ends it has projecting portions $c'$ of a reduced diameter one of which is formed with transverse aperture $c^2$, adapted to receive a lock pin E, which, when the parts are assembled passes through a coincident aperture $d^2$ in the axle and locks the filler thereto.

In the peripheral face of the filler C are formed two parallel grooves C' C', which are spaced sufficiently apart, and at each side of its central vertical bearing line, as to give the wheel a steady bearing and prevent it from wabbling the grooves being also of a sufficient depth to form perfect guides for the bearing balls F, which are fitted in the grooves when such filler is adjusted to bring the grooves in line with the beveled portion $b^x$ of the chamber B'. It will be noticed that these grooves are placed with reference to the wheel, so as to sustain the weight of the car from a point of contact vertically from the track to the center of the bearing axle. To hold the filler from working outward, the axle D is formed with a shoulder $d$, which is adapted as it moves laterally outward, to engage the wall or inner face of the wheel, and when such axle moves inward the reduced portion or boss $c'$ engages the inner face of such front wall as shown; it being obvious that by forming a boss $c'$ on the filler as shown the friction between the ends of the filler and the inside of chamber D' will be much reduced.

In practice the aperture $b^2$ through which the axle spindle passes is made of a diameter sufficiently to allow such spindle to pass through without engaging the aperture, thereby holding the wheel proper entirely free from contact with the axle and placing the entire bearing strain on the filler.

In cases where the improved wheel is made entirely in accordance with my invention, I use a spindle formed non-circular, to save expense of swaging and turning axle bearing round, but where wheels are made to replace those running on round axles, such axle is connected by a pin or other means with the filler.

So far as described it will be readily seen that by arranging the filler, the balls and the receiving chamber as shown, no special cap plate or similar means are needed for holding the balls in place. Furthermore as the filler is held stationary with the axle, which is held from turning, and forming the axle passage of the wheel larger in diameter than the axle the bearing of the wheel will be entirely on the balls in the lower portion of the grooves and on the filler on points below the horizontal line drawn through the center of the filler. It will also be noticed that as the wheel turns about the filler and as the balls are spherical, such balls will continuously turn in the grooves and thereby wear uniformly, and in case the lower face of the grooves become worn, it is only necessary to remove the pin E and turn the filler half way around on the axle, which adjustment brings into position an entirely new bearing for the balls passing under the weight of the load between the filler and point of contact of the balls against the inside of the lowest point of the chamber B'. By dispensing with a cap plate, the filler can be quickly inserted in position in the chamber B' and readily removed by drawing the pin E.

Having thus described my invention, what I claim, and desire to secure by Letters Patent, is—

1. As an improvement in car wheels, the combination with a wheel having its hub portion formed with a central socket or chamber, having its base or inner wall centrally apertured to receive the axle, and a non-rotatable axle projected into such chamber, of a filler of slightly less diameter than the chamber, adapted to be slid endwise therein, said filler having a plurality of annular grooves, the bearing balls fitted therein to engage the wall of such chamber, and means for adjustably connecting such filler on the axle, whereby it will be held from turning when fitted thereon and whereby its upper and lower faces can be turned to diametrically opposite points as the lower or bearing face becomes worn, all substantially as shown and for the purposes described.

2. As an improvement in car wheels the combination with the wheel A, having a central socket or chamber B' having in its base or rear wall an aperture $b'$ of a larger diameter than the axle, and the axle projected into such chamber having a collar $d$, abutting the face of the wheel, and its end apertured, of the filler C held on the axle said filler having a central reduced portion $c'$ at one end and a reduced apertured portion $c^2$ at the other, a key fitting the aperture and the coincident aperture in the axle, and provided with annular grooves $c'$, and the balls F fitting such grooves all arranged substantially as shown and described.

HALLAM F. COATES.

Witnesses:
   JNO. L. LOCKE,
   L. H. CAMPBELL.